3,114,737
AQUEOUS POLYMERIZATION PROCESS INCORPORATING CO-CATALYST OF ORGANO-METALLIC COMPOUND AND HALOGENATED ACETIC ACID
Daniel F. Herman, Orange, N.J., and Dominic Simone, Bronx, and Roger M. Weil, New York, N.Y., assignors to National Lead Company, New York, N.Y., a corporation of New Jersey
No Drawing. Filed Feb. 11, 1958, Ser. No. 714,503
4 Claims. (Cl. 260—88.7)

This invention relates to the polymerization of vinyl monomers. In particular, this invention relates to a novel process for effecting the polymerization of vinyl monomers in an aqueous medium.

Processes incorporating titanium compounds such as $TiCl_4$ and the like had previously been known and used in the polymerization of certain monomers such as styrene. These titanium compounds have been used in a solution type of polymerization with a cocatalyst such as an alkyl metal. The process involved the use of an organic solvent, as the titanium compounds and the cocatalysts were unstable in the presence of water and would decompose. Previous processes involving the use of the previously commercially used titanium compounds and the prior accepted cocatalysts were not used for the polymerization of vinyl monomers such as methyl methacrylate. The use of an aqueous system was desirable for two reasons; (1) most polymers are soluble in most other organic solvents which are of sufficiently low molecular weight to permit recovery by distillation; (2) water is inexpensive and non-hazardous.

An object of this invention, therefore, is to provide an improved method for the polymerization of vinyl monomers. Another object is to provide an improved method for the polymerization of vinyl monomers which may be carried out in an aqueous medium using a titanium or zirconium catalyst. Still another object is to provide an improved method for the polymerization of vinyl monomers in an aqueous medium using a titanium or zirconium catalyst and a cocatalyst which are compatible with water. Other objects and advantages will become apparent from the following more complete description and claims.

Broadly, this invention contemplates a process for the aqueous polymerization of vinyl and related monomers, said vinyl and related monomers being selected from the group consisting of acrylates, alkyl substituted acrylates, styrene, alkyl substituted styrene, and acrylonitrile, comprising the steps of dispersing said monomer in an aqueous system containing a compound of the formula $R_nMR'_m$, where in R is a monovalent hydrocarbon radical selected from the group consisting of cyclopentadienyl and substituted cyclopentadienyl radicals, M is a metal selected from the class of metals consisting of zirconium and titanium, R' is selected from the group consisting of alkoxy, cycloalkoxy and acyloxy groups and halogen atoms, n is from one to two and m is from two to three, the sum of m and n being from three to four, and heating the mixture until the reaction is substantially complete. This invention also contemplates a process as aforesaid wherein said compound is used in conjunction with a cocatalyst, said cocatalyst being selected from the group consisting of the halogenated acetic acids.

In a particularly desirable embodiment this invention contemplates a process as aforesaid wherein said compound contains a cyclopentadienyl, or substituted cyclopentadienyl, substituted indenyl, indenyl radical, such as dicyclopentadienyltitanium dichloride, dicyclopentadienylzirconium dichloride, diindenyltitanium dichloride, monoindenyl titanium dichloride, or dimethylindenyltitanium dichloride. The preparation of these compounds has been described in co-pending application, Serial Number 443,956, D. F. Herman, filed July 16, 1954, now U.S. 3,027,392, assigned to the assignee hereof. Among the monocyclopentadienyl titanium compounds useful in this invention are monocyclopentadienyl titanium dichloride and the like. In addition, the compound monocyclopentadienyltitanium dibutoxy monochloride has also been found to be effective. This last mentioned compound, see copending application, Serial Number 530,607, filed August 25, 1955, D. Herman and R. Weil, now U.S. 2,898,355, process claimed therein, may be prepared by adding titanium tetrachloride to an excess of butyl titanate and then adding dropwise to this, cyclopentadiene and triethyl amine and refluxing the reaction mixture for several hours. The white powder which forms, triethylamine hydrochloride, is filtered off, the solvent is then removed using a normal pressure distillation, and the monocyclopentadienyltitanium dibutoxy monochloride is isolated by vacuum distillation. The alkoxy and cycloalkoxy groups, if present, may be substituted or unsubstituted and saturated or unsaturated groups containing up to about 16 carbon atoms. It is preferred however, in the case of the alkoxy and cycloalkoxy groups, to employ low molecular weight groups containing less than 6 carbon atoms such as monocyclopentadienyltitanium dibutoxymonochloride, and monocyclopentadienyltitanium-dicyclopentoxymonochloride, because such groups are more reactive. The acyloxy groups may be a halogenated acyloxy group, such as dicyclopentadienyltitanium-ditrichloride, or not. It may contain up to about 8 carbon atoms. It is preferred however to employ those groups containing 6 or less carbon atoms as these have generally been found to be more effective.

The cocatalyst may be any halogenated acetic acid, but it is preferred to use trichloroacetic acid as still better yields are obtained as compared to the good yields obtained using the other halogenated acetic acids.

The monomers useful in this process include acrylates, alkyl substituted acrylates, styrene, alkyl substituted styrene, and acrylonitrile.

By acrylate, we mean the esters of acrylic acid containing the monovalent $H_2C=CHCOO$-group, such as methylacrylate, ethylacrylate, hexylacrylate, octyl acrylate, and the like, as well as acrylic acid itself.

By alkyl substituted acrylates, we mean the esters of alkyl substituted acrylic acids containing the monovalent $H_2C=CHCOO$-group, and having said alkyl substitution on the $H_2C=CHCOO$-group, such as methyl methacrylate, octyl methacrylate, ethyl-(alpha ethylacrylate), methyl-(alpha butylacrylate), and the like, as well as the acids themselves.

The alkyl substituted styrene, is one where the alkyl substitution is on the aromatic portion of the molecule, such as vinyl toluene, isopropyl styrene, and the like.

Water must be present. The role of water in the process according to this invention is not fully established, but the process appears to be effective only when water is also present.

The time necessary to effect polymerization will vary according to the reaction conditions employed, but is short in all cases. The reaction proceeds, readily at room temperature although higher temperatures may be employed, if desired, up to the boiling point of water at the pressure employed. No great pressure is necessary in order to cause the reaction to proceed; atmospheric pressure is ordinarily satisfactory. Moderately increased pressures up to about 3 or 4 atmospheres may be employed if desired and are sometimes advantageous.

In order to more fully illustrate the nature of this invention and the manner of practising the same, the following examples are presented.

Example I

To a flask containing 250 parts of water, was added 100 parts of methylmethacrylate, 1 part of dicyclopentadienyltitaniumdichloride and 1.3 parts of trichloroacetic acid. The reaction was run under a nitrogen atmosphere, stirred, and heated to 50° C. until the reaction was complete. A high yield of white polymethylmethacrylate was obtained by washing the product with methanol and drying it at a moderate temperature under vacuum.

Example II

To a flask containing 100 parts of benzene was added 1 part of dicyclopentadienyltitaniumdichloride, 0.5 part of zinc dust, and 5 parts of acetic acid. The reaction was run under a nitrogen atmosphere, stirred and heated slightly until the reaction was complete. The dicyclopentadienyltitaniumdichloride was thus reduced from the tetravalent state to the trivalent state. The compound formed was dicyclopentadienyltitaniummonochloride.

The procedure of Example I was then followed, except that an equivalent amount of the dicyclopentadienyltitaniummonochloride was used instead of the dicyclopentadienyltitanium dichloride. A high yield of white polymethylmethacrylate was obtained in the manner of Example I.

Example III

The procedure of Example I was repeated, but an equivalent amount of dicyclopentadienyl-zirconium-dichloride was used instead of the dicyclopentadienyltitanium dichloride. No halogenated acetic acid was used in this Example III. A high yield of white polymethyl methacrylate was obtained in the manner of Example I. The yield here was high, but not as high as when a halogenated acetic acid was used, as in Example IV.

Example IV

The procedure of Example III was repeated, but trichloroacetic acid in an amount equivalent to the amount in Example I, was incorporated into the reaction mixture, and the reaction was run at 65° C. An extremely high yield of white polymethyl-methacrylate was obtained in the manner of Example I.

Example V

The procedure of Example I was repeated, but no halogenated acetic acid was herein used and the reaction was run at 95° C. The monomer used, in an amount equivalent to the amount of monomer used in Example I, in this example was styrene. A good yield of white polystyrene was obtained in the manner of Example I.

Example VI

The procedure of Example I was repeated, but no halogenated acetic acid was herein used. A good yield of white polymethyl-methacrylate was obtained in the manner of Example I. The yield here, however, was not as good as the yield obtained with a halogenated acetic acid.

Example VII

The procedure of Example I was repeated several times. The halogenated acetic acid used was changed each time. The halogenated acetic acids in amounts equivalent to the amount used in Example I, were: Trifluoroacetic acid, tribromoacetic acid, dichloroacetic acid, dibromoacetic acid, difluoroacetic acid, diiodoacetic acid, triiodoacetic acid, iodoacetic acid, bromoacetic acid, fluoroacetic acid, and chloroacetic acid. Each time a good yield of white polymethyl-methacrylate was obtained in the manner of Example I. In each case, the yield obtained using a halogenated acetic acid was substantially higher than when no halogenated acetic acid was used.

Example VIII

The procedure of Example I was repeated, but an equivalent amount of monocyclopentadienyltitanium dibutoxy monochloride was used instead of the dicyclopentadienyltitanium dichloride. A high yield of white polymethylmethacrylate was obtained in the manner of Example I.

Example IX

The procedure of Example I was repeated several times. Each time, an equivalent amount of a different monomer was used in the reaction. Among the monomers used were: ethyl acrylate, hexylacrylate, octylacrylate, octylmethacrylate, ethyl-(alpha ethylacrylate), methylacrylate, methacrylic acid, acrylonitrile, acrylic acid, methyl-(alpha butyl acrylate). Each time, a good yield of white polymer was obtained in the manner of Example I.

Example X

The procedure of Example I was repeated, but an equivalent amount of monocyclopentadienyl-titanium-dicyclopentoxy-monochloride was used instead of the dicyclopentadienyl-titanium-dichloride. A high yield of white polymethylmethacrylate was obtained in the manner of Example I.

Example XI

The procedure of Example I was repeated several times. Each time an equivalent amount of a different titanium compound was used in the reaction. Among the titanium compounds used were: methylcyclopentadienyltitanium dichloride, indenyltitanium dichloride, and fluorenyltitanium dichloride. Each time, a good yield of white polymer was obtained in the manner of Example I.

Example XII

The polymethyl methacrylate formed in Example I was compression molded into several articles, such as a toy fire engine, a display stand for shoes, a costume jewelry bracelet, and the like.

The procedure for the compression molding was as follows: (1) The mold was preheated and the polymer was put in the lower half of the mold, (2) The mold was slowly closed until the material began to flow, at which time the rate of closing of the mold was slowed down to nearly an imperceptible speed. After the excess material has flashed out and the upper part of the mold has seated on the cut-off areas of the lower half of the mold, the mold was allowed to remain closed for a definite period of time. (3) After the mold has been closed for the requisite period of time, it was opened and the piece ejected hot, by an air blast. (4) The molded article was then defined and buffed.

The process of this invention is simple and can readily be carried out by the operator, without special skill or training. The use of water as an essential part of this invention substantially eliminates other costly and hazardous media. The use of the titanium compounds herein described, now, for the first time, makes it possible to perform an aqueous polymerization using a titanium containing compound. The halogenated acetic acids are new types of compounds used, in conjunction with the titanium compounds herein described, for this purpose and are compatible with water.

The resultant polymers were used to make a wide variety of articles via injection molding, compression molding, casting, and in addition, the polymers were extruded, and were also calender milled into sheets. The milling and extruding enable the producer of the polymers to supply the manufacturer of various articles with a convenient form of the polymers ready for processing into the finished article.

While this invention has been described in terms of certain preferred embodiments and illustrated by means of specific examples, these are illustrative only, and the invention is not to be construed as limited, except as set forth in the following claims.

We claim:

1. A process for the aqueous polymerization of vinyl and related monomers, said monomer being selected from the group consisting of acrylic acid, acrylates of saturated aliphatic alcohols, alkyl substituted acrylates of saturated aliphatic alcohols, styrene, alkyl mono-substituted styrene, said mono-substitution being on the aromatic portion of the molecule, and acrylonitrile, comprising steps of dispersing said monomer in an aqueous system containing a compound of the formula $R_nMR'_m$ wherein R is a monovalent hydrocarbon radical selected from the group consisting of cyclopentadienyl, indenyl, methylindenyl, dimethylindenyl, methylcyclopentadienyl and fluorenyl radicals, M is a metal selected from the class of metals consisting of zirconium and titanium, R' is selected from the group consisting of alkoxy, cycloalkoxy, and acyloxy groups, and halogen atoms, $n$ is from one to two and $m$ is from one to three, the sum of $m$ and $n$ being 3 to 4, wherein said compound is used in conjunction with a co-catalyst, said co-catalyst being selected from the group consisting of the halogenated acetic acids, and heating the mixture until the reaction is substantially complete.

2. A process according to claim 1, wherein said compound is dicyclopentadienyltitanium dichloride.

3. A process according to claim 1, wherein said compound is dicyclopentadienylzirconium dichloride.

4. A process according to claim 1, wherein said co-catalyst is trichloroacetic acid.

References Cited in the file of this patent

UNITED STATES PATENTS

| 2,827,446 | Breslow | Mar. 18, 1958 |
| 2,922,803 | Kaufman | Jan. 26, 1960 |

FOREIGN PATENTS

| 555,789 | Belgium | Mar. 14, 1957 |

OTHER REFERENCES

Gorsich: J. Am. Chem. Soc. 80, 4744–5, September 1958.

Gaylord et al.: Linear and Steroregular Addition Polymers, pp. 95–96, Interscience (1959).